T861040

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 22, 1969

861 O.G. 1019

788,993

SYNERGISTIC STABILIZERS FOR POLYOLEFINS

John W. Tamblyn, Kingsport, Tenn. (P.O. Box 92, Jonas Ridge, N.C. 28641), and Gordon C. Newland, P.O. Box 511, Kingsport, Tenn. 37662

Continuation of application Ser. No. 601,311, Dec. 13, 1966. This application Dec. 26, 1968. Published Apr. 22, 1969

Class 260—886

No Drawing. 17 Pages Specification

Organic materials, and particularly polyolefins, may be stabilized against the degradative effects of ultra-violet light by a synergistic combination of a 2-hydroxybenzophenone compound and a compound selected from the group consisting of long chain alkanes, long chain alicyclic monoolefins, cycloalkenes, cycloalkanes, naphthalene, citral, linalool, indene, polystyrene, and a compound of the general formula

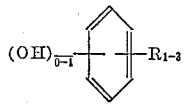

wherein R is H, alkyl cycloalkyl, alkylphenyl, alkenylphenyl, or alkynylphenyl. Some of these materials provide end products having a pleasant scent or microbiocidal properties.